April 28, 1942.   R. L. BARRISH ET AL   2,281,405
METHOD AND APPARATUS FOR TRANSMISSION OF SIGNALS
Filed May 11, 1938   4 Sheets-Sheet 1
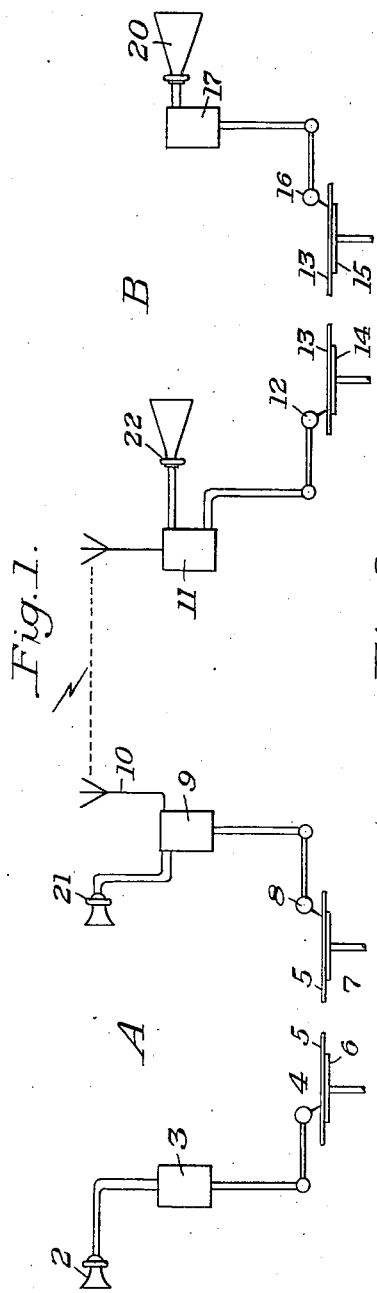
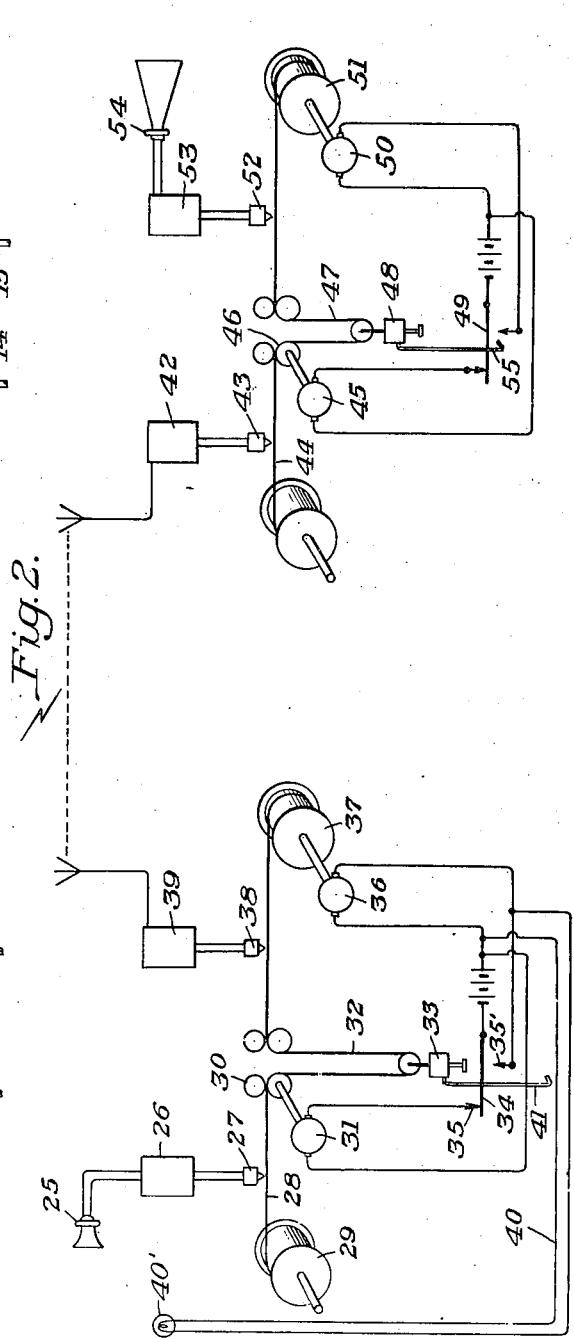
INVENTOR
Robert Lloyd Barrish
George Barrish

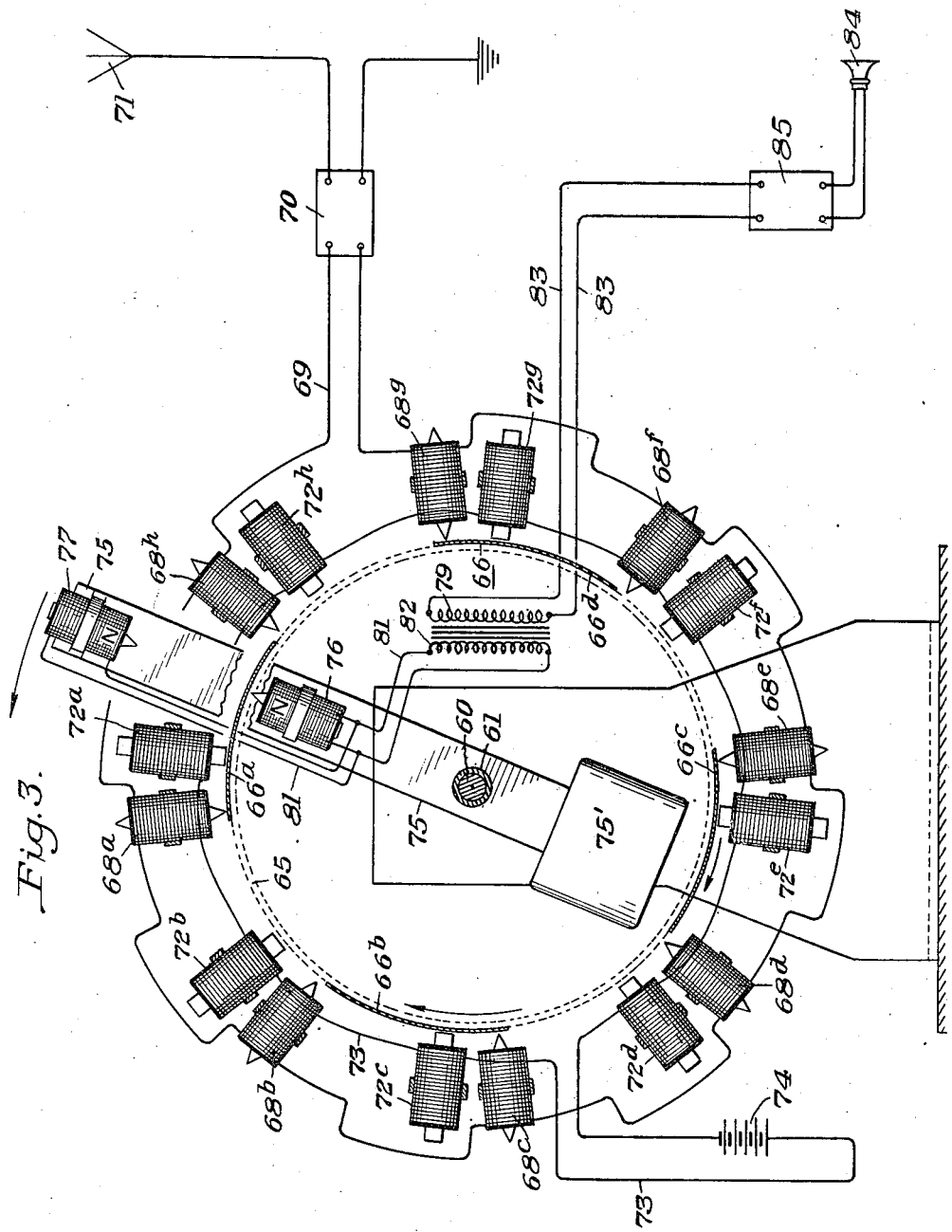

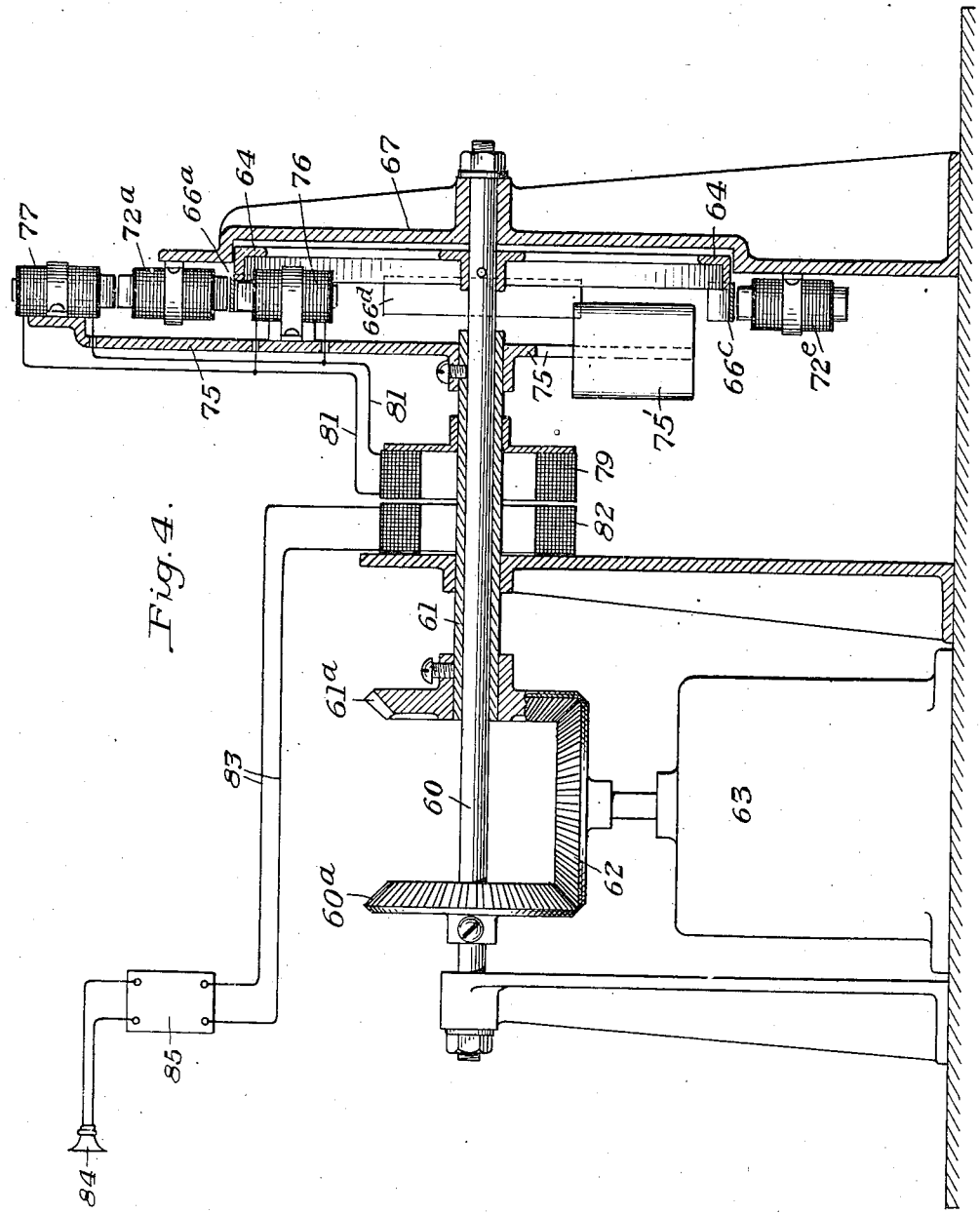

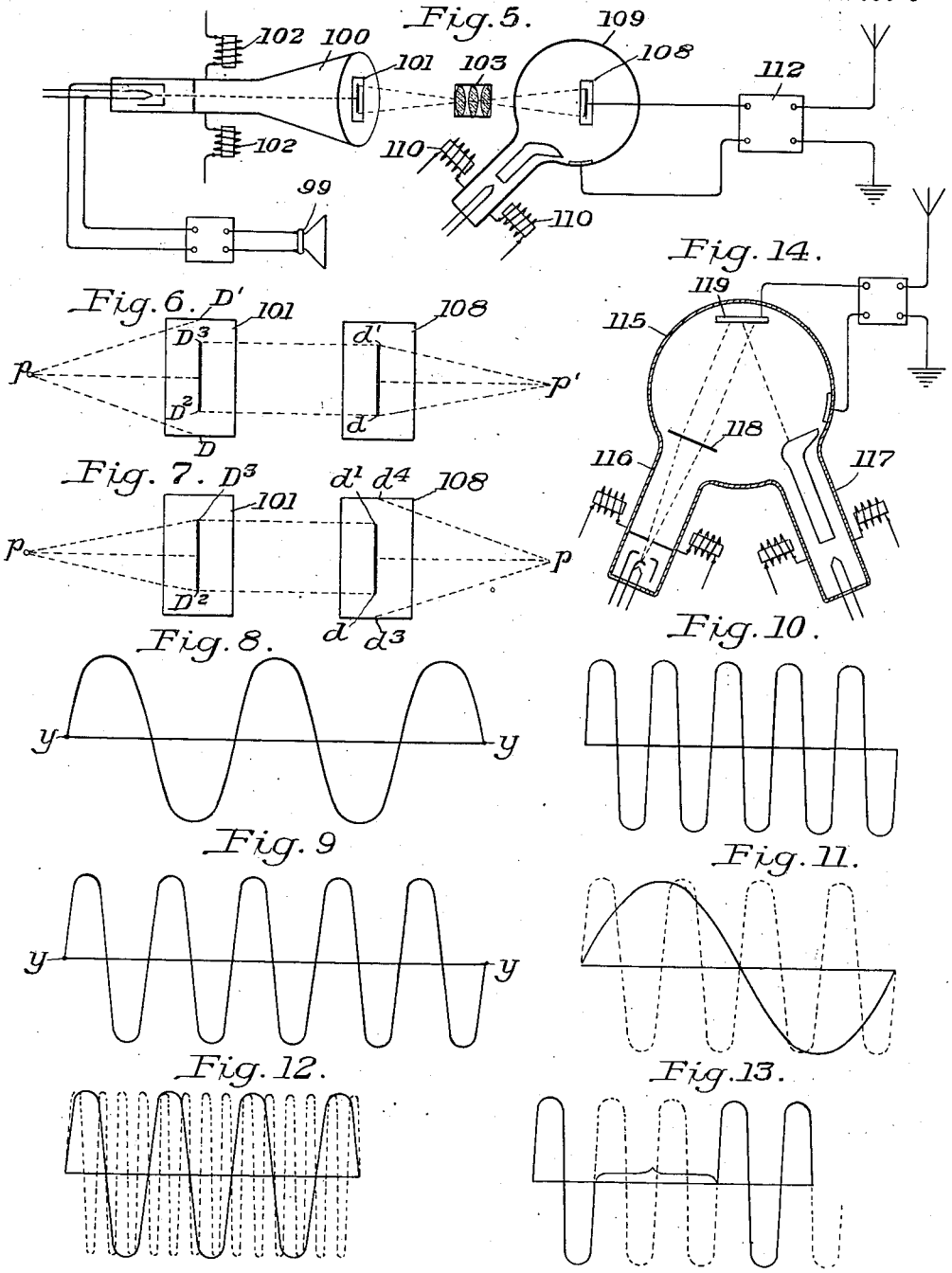

Patented Apr. 28, 1942

2,281,405

UNITED STATES PATENT OFFICE 2,281,405

METHOD AND APPARATUS FOR TRANSMISSION OF SIGNALS

Robert Lloyd Barrish and George Barrish, Pittsburgh, Pa.

Application May 11, 1938, Serial No. 207,332

6 Claims. (Cl. 179—1.5)

This invention relates to a signaling method and apparatus and more particularly to a method and apparatus involving the changing of the pitch level of a given signal and further pertains to the utilization of such change in pitch level in either radio or wire communication for the elimination of interference.

In the present description and specification, we will describe the invention with particular reference to its application to sound signals, but this is for the purpose of illustration and not by way of limitation.

A certain time is required for the utterance or generation of any sound. The pitch of the sound depends upon the number of vibrations per second. Increasing the number of vibrations increases the pitch and decreasing the number of vibrations per second decreases the pitch. It is a well-recognized fact that sound may be recorded, as for example, on a phonograph record, in the pitch level at which the sound is generated and that by speeding up the record in reproducing the sound, it will be reproduced at a higher pitch due to the fact that a record is played in a shorter length of time and therefore the number of vibrations per second is increased. Likewise, if the record is slowed down, the pitch will fall because it takes longer to play the record and the number of vibrations per second is therefore reduced. According to the present invention, this principle is utilized. Among other things, it may be utilized in the transmission of signals from a sending station to a receiving station for the purpose of eliminating or reducing the effect of interference, as will hereinafter more fully appear. It is also well-recognized that sound waves may be utilized to modulate either a continuous or a discontinuous current, as for example, a carrier current or a carrier wave. Where the carrier current or carrier wave is an alternating current, the transmitted sound wave is not a continuous wave but is an interupted wave. However, in practice the frequency of the alternating carrier current approximates or is beyond the upper limit of audibility, so that the sound wave being transmitted is heard as a continuous sound although in fact it is not continuous. Certain phases of the present invention utilize this principle, as will hereinafter more fully appear.

According to a simple embodiment of the present invention, sound waves may be recorded on a phonograph record or on a magnetic tape or on a photograph film in the pitch range at which they are generated. The record is then transferred to an appropriate pick-up apparatus and operated at a higher or lower speed than the speed of the original record. The signal impulses so generated are then transmitted in this higher or lower pitch level either by radio or by wire to a receiving station where they are again recorded at the pitch level of transmission. The record so made is then transferred to a translating device where the record is operated at approximately the speed of the original recording at the transmitting station, restoring the signal to the pitch range or pitch level at which it was originally recorded at the transmitting station. If there is interference in the transmitting channel between the sending and receiving stations, this interference will be recorded at the receiving station in the pitch range or at the pitch level at which it is generated. Then when the record is transferred to the translating device at the receiving station and operated to restore the transmitted signal to its normal pitch range, the interfering signal which has been recorded will be reproduced at a frequency well above or well below the pitch level of the transmitted signal so that the transmitted signal can be readily distinguished from the interference. By transmitting the signal in a very low pitch range, for example, and recording it at the receiving station and then increasing the speed of the record at the receiving station when it is being translated, the signal will be brought back to the normal pitch level in which it was originally recorded at the transmitter, whereas static or other interference will be raised to a pitch range approximating or even beyond the limit of audibility, depending upon the variation between the recording speed at the transmitting station and the transmitting speed.

It will be readily apparent that while such a system keeps the interference at the receiving station in a pitch range quite widely separated from the pitch level of the transmitted signal, there is a necessary time lag between the generation of a signal at the transmitting station and the reproduction of such a signal at the receiving station. This time lag is due to the fact that the record must be made at one speed and then reproduced at a different speed, recorded at the receiving station during the time of transmission and then reproduced at still a different time interval. This difference in time between the generation of the signal at the transmitting station and its reproduction at the receiving station offers certain objections, particularly to continuous transmission and reception or to two-way conversation.

A further embodiment of the invention is therefore a method and apparatus by means of which the same effect can be secured as where an ordinary phonograph record is used but wherein there is no appreciable time lag between the generation of the sound at the transmitting station and its reproduction at the receiving station. This method and apparatus involve the practically simultaneous generation of sound and its translation into electrical impulses in a different pitch range from that at which the sound is generated practically instantaneously and is not only applicable to transmission of signals between stations, but for various other methods of signaling or detection of vibration. For example, it may be utilized in the detection of vibrations generated at a superaudible frequency by translating them through a reduction or increase in the pitch level to audible frequency. It may be used through the change in pitch level which it provides for the study of certain overtones by bringing the overtones into a lower pitch range and dropping the basic sound to a range below audibility. It may be utilized in conjunction with a stethoscope to make audible inaudible sounds issuing from the heart or the lungs and thus assist in the diagnosis of disease. Scratching on phonograph records or on talking films consists of vibrations existing between fairly definite limits of sound frequency. By the use of our method, sound may be recorded at a pitch range above or below the limits of the sound frequency aforesaid. And when the sound is reproduced in the normal pitch range, the scratching frequencies are produced above or below the sound, and can easily be filtered out. It may be utilized in securing various unique sound effects as, for example, a singer's voice may be reproduced in its natural pitch level and also in a slightly shaded pitch level to give the effect of a duet or a plurality of voices, or he may be simultaneously heard singing in two or more octaves. These are merely illustrative of the results obtainable through the use of this invention.

In all embodiments of the invention, there is involved the common idea of changing sounds or other signals into electrical impulses of a pitch level higher or lower than the pitch level in which the sound is created, which impulses may be translated into sounds or other signals either in the different pitch level, or, after transmission through interference, restored to the normal level.

The invention may be more fully understood by reference to the accompany drawings, in which Figure 1 is a simple schematic illustration of a method of transmitting signals to eliminate or reduce the effect of interference, the view being entirely schematic and showing the invention in its simplest embodiment;

Figure 2 is a view quite similar to Figure 1, this also being a schematic view showing an approach to a more continuous method of signaling, transmitting to a receiving station;

Figure 3 illustrates with more or less detail a form of apparatus for use in changing the pitch level for use where the electrical impulses of a different pitch level are produced practically simultaneously with the generation of sound, Figure 3 being schematic, however, as to certain parts;

Figure 4 represents a longitudinal section through the apparatus shown in Figure 3, this view being in part a mechanical view and in part a schematic view;

Figure 5 is a schematic view of an apparatus for accomplishing the purpose of the device shown in Figures 3 and 4 utilizing solely certain photoelectric and electronic principles;

Figure 6 is a schematic view for illustrating certain principles involved in the operation of the arrangement shown in Figure 5;

Figure 7 is a view similar to Figure 6, for illustrating a method of operation with the apparatus of Figure 5 where the frequency of the generated electrical impulses is to be higher than the natural frequency;

Figure 8 is a simple diagram of a given wave form;

Figure 9 is a similar diagram;

Figure 10 is a diagram of a wave form as recorded for transmission at the transmitting station;

Figure 11 is a diagram showing the wave form of Figure 10 as received at a receiving station after the pitch range has been reduced to a fraction of the pitch range of the original signal and showing an interfering wave form superimposed thereon at the frequency at which the interfering wave form is generated;

Figure 12 is a diagram illustrating the effect of the speeding up of the record of Figure 12;

Figure 13 is a diagrammatic view illustrating the method of changing the pitch of the sound signal from a higher to a lower level as effected through the apparatus of Figures 3 and 4 or the apparatus of Figure 5.

Figure 14 is a diagrammatic view showing a modification of the apparatus shown in Figure 5.

Referring first to Figure 8, this view represents a simple form of sound vibration in which the straight line $yy$ represents time and the sinous line represents the wave form of sound. In Figure 8 there are approximately 3 wave crests above line $yy$. Referring now to Figure 9, if the line $yy$ remains of the same length and the number of wave crests in the same period of time is increased, the pitch of the sound is higher than the pitch of the sound where there are fewer waves per unit of time. Likewise, reducing the number of wave crests per unit of time decreases the pitch of sound. The present invention contemplates the spreading out or the compressing of the sound wave vibrations per unit of time and the utilization of this spreading out or compressing of the sound waves to a predetermined extent with the utilization of the effects so obtained in various ways.

For example, Figure 1 pertains to a method of signaling wherein this change in the pitch level of sounds is employed to transmit signals over a channel in which interference may exist. The channel may be space as in the case of radio or the invention may be applied to the transmission of signals over wires or cables. Through the use of the present invention, disturbing influences, as for example, static disturbances or other signals being transmitted over the same channel are minimized or entirely eliminated. Figure 1 illustrates the application of the invention to radio wherein the wave band represents a channel of communication between separated stations, but the invention may be likewise employed with wire connections between stations. Generally speaking the invention as disclosed in Figure 1 contemplates the recording of a signal mechanically, electrically, or optically on a record or tape operating at a predetermined speed. This record is then transferred to a transmitting station where the signals are translated from the record into signal impulses at a speed widely different from the recording speed of the record. This makes a wide variation in the pitch frequency between the signals as originally recorded and the signals as transmitted. At the receiving station the signals are again recorded on a record operating at a speed commensurate with the speed of the record at the transmitting station. The record so made at the receiving station is then transferred to a translating device where the signals are reproduced with the record moving at approximately the same speed at which the signals were initially recorded at the transmitting station. This changes the pitch frequency of the transmitted signals back to the pitch frequency or pitch level at which they were originally recorded. Thus, while the signals were transmitted from the sending to the receiving stations at pitch levels high above or much below the initial recording speed, they were ultimately reproduced in the translating device at the receiving station at their original pitch level. If there is interference in the wave channel over which the signals are transmitted, this interference will be recorded at the receiving station along with the signal impulses, but at the normal frequency or pitch level at which the interference is produced. When the record at the receiving station is run through the translating mechanism at a speed to restore the transmitted signals to normal pitch, the pitch of the interfering signals is raised above or dropped below the pitch range of the transmitted signals so that the transmitted signals may be heard in a pitch range entirely distinct from the pitch range in which the interference is reproduced.

Referring in detail to Figure 1 of the drawings, A designates a transmitting station and B represents a receiving station. At the transmitting station A, there is illustrated a microphone 2 adapted to impress a received signal through an amplifier 3 to a recording phonograph 4 having a disc record 5 on a turntable 6 which is driven at what may be termed a normal recording speed. At the transmitting station there is illustrated a second turntable 7 to receive the record 5 after the record has been made on the turntable 6. The turntable 7 is operated at a speed greatly above or greatly below the normal recording speed of turntable 6. The signal impulses on the record 5 on this second turntable 7 are picked up by translating means 8 and impressed on a transmitter indicated generally at 9 connected to an antennae or other transmitting channel 10. If the turntable 7 is operated at a speed considerably higher than the turntable 6, the voice modulations of the radiated signal will be at a pitch range where, upon their reception, they would be above the normal range of audibility or in a range at least approaching the limits of audibility.

At the transmitting station B there is a receiver 11 of any conventional type where the received signal impulses are received from the transmitter 9 and recorded by translating device 12 on a record 13 on a turntable 14, the speed of which is approximately the same as that of the turntable 7. When the signal has been completely recorded on the record 13, the record 13 is transferred to turntable 15 operating at a normal speed approximating the speed of the turntable 6. Here the recorded signal is picked up by the usual translating device 16, impressed on an amplifier 17, and made audible through a receiver or other translating device 20. The transmitted signal will thus be reproduced from a record traveling at the same speed at which the signal was originally recorded on the record 5 and the voice will be heard in the normal pitch range at which the signal was spoken into the microphone 2.

Assuming first that stations A and B are linked by radio as illustrated and that severe static disturbances exist at the time that the signal is being transmitted, these static disturbances will be picked up in the receiving station 11 and will be recorded on the record 13. If the record 13 were reproduced at the speed at which the record 13 is made, only static disturbances would be audible while the signal impulses would be very high or above the range of audibility. When the record 13, however, is run at a normal speed corresponding to the speed of the turntable 6, the voice of the transmitted signal is brought back to the normal pitch range while the static signals drop below the range of audibility or drop to such a low pitch that the transmitted signal can be easily heard in a pitch range entirely above them. If necessary, filter circuits could be used in the apparatus 17 to separate out the static or other interference in the very low pitch range.

Likewise, the apparatus described in Figure 1 can be used by operating the turntables 7 and 14 at speeds vastly below the speeds of operating of the turntables 6 and 15. With this method of operation, the static or other interference would be raised to a point either approximating or wholly above the limits of audibility while the voice level would be stepped up to normal from the pitch over which it was transmitted through space.

With static interference this method of operation, i. e., what we term the "slowing down" method is probably preferable because of the fact that static has a higher pitch, and therefore it is not difficult, on reproducing the record, to take the static into the super-audible range.

It will, of course, be apparent that instead of using two turntables 6 and 7 in the transmitting station and 14 and 15 in the receiving station, this may be the same turntable operated at different speeds.

Instead of the interference arising from static, the interference may arise from other signals being transmitted over the same wave channel. For example, at station A there may be a second microphone 21 also modulating the output of the transmitter 9 at normal voice frequency while the phonograph pick-up is modulating the output of the transmitter 9 at a super- or subnormal pitch. Both sets of signals will be simultaneously transmitted through space and picked up by the receiver 11. The receiving station 11 may have, in addition to the phonographic recorder 12, a translating device 22. The voice spoken into the microphone 21 would thus be picked up and heard in the translating device 22, and since it would be a pitch level distinct from the pitch level of the recorded voice being transmitted from station A, it could be heard at the translating device 22. Filter circuits of a type well known in the art could be employed for securing further separation if desired. The voice signals spoken into microphone 2 at the sending station A would likewise be recorded on the record 13, but when the record 13 is reproduced at the normal operating speed for the record, voice signals sent through the microphone 21 would be at a pitch level in the reproducing device 20 above or below the other signal. Thus, it will be seen that the same channel may be used for the simultaneous transmission of two sets of signals. Likewise, instead of the interference or secondary signal being transmitted from station A to station B, the interfering signal could be transmitted in the reverse direction over the same wave channel from station B to station A. Also, instead of the interfering signals being generated at station A in the microphone 21, the interfering signals might just as well be generated in the same wave channel from a third station not shown whose impulses would be picked up by the receiver 11 at station B along with the transmitted signal from station A.

The result of the method is graphically illustrated in Figures 10 to 12 inclusive. Figure 10 illustrates the simple sound wave diagram for the signal as originally produced in the transmitting station. Four complete wave cycles are illustrated in this diagram for a unit of time. When the record is slowed down at the transmitter, there may, for example, be only a single wave cycle per unit of time. This is illustrated by the full line wave of Figure 11. The full line wave form of Figure 11 may also represent the transmitted signal as recorded at the receiving station. The dotted line wave form represents interference which has also been recorded at the receiving station and for the purpose of illustration this interference has been shown as also having four wave cycles per unit of time. When the record of Figure 11 is speeded up say to four times the speed at which the record was made, the transmitted signal is brought back to the same pitch as shown in Figure 10, the solid line in Figure 12 representing the transmitted signal. The interfering signal, represented by dotted lines, however, is crowded together to a very much higher pitch level, which may be the pitch level approximating or above the range of audibility. The method shown in Figure 1, therefore, results in separating interference and the transmitted signal into widely different levels, so that the transmitted signal can be readily distinguished audibly from the interference and the separation may be such that where necessary, filtering circuits can be employed to separate the transmitted signal entirely from the interfering signal or interference.

Figure 2 illustrates a slight modification of the arrangement shown in Figure 1. The same general method and principle is used, the only difference being that a system has been shown for recording the signal on a tape as, for example, the magnetic recording of the signal on a steel tape in accordance with known methods. Likewise, the tape might be a photographic tape with a photographic recordation of the signals as employed, for example, in motion picture films. In this figure, 25 designates a transmitter or microphone for a recorder 26—27. The recorder 26—27 records the signal on an elongated tape 28 coming off a reel 29 through feed rolls 30. The feed rolls 30 are shown as being driven by a motor 31. The motor 31 operates until a certain length of tape has been recorded whereupon this length of tape accumulates in a loop 32 from which is suspended a switch operating weight 33. When the weight 33 moves downwardly a predetermined distance, it engages switch arm 34 opening the circuit with switch contact 35 to stop the motor 31. The switch arm 34 simultaneously engages contact 35 to energize a motor 36 that operates a take-up spool 37. As the record is wound up on the take-up spool, it passes under a pick-up device 38 for modulating the out-put of the transmitter 39. The contacts 34 and 35 also close a circuit 40 to a signal 40' to indicate to the person at the transmitter that the motor 31 has stopped. As the take-up reel 37 winds up the tape, the loop 32 shortens, lifting the weight 33 and from this weight is suspended a hook 41. When a predetermined amount of slack has been taken up in the loop 32, the hook 41 will engage the switch arm 34 opening the circuit to the motor 36 and closing the circuit to the motor 31. It is intended according to the present method, that motor 36 move the record under the pick-up device 38 at a speed high above the speed at which the tape moves under the recording device 27 in accordance with the principles explained in connection with Figure 1.

A generally similar arrangement is provided at the receiving station where the received signal impulses being impressed upon a receiver 42 actuate a recording device 43 to record the received impulse on a tape 44. This tape is drawn off a reel by motor 45 driving feed rolls 46, the motor 45 and the feed rolls 46 feeding the tape to a loop 47. Suspended from this loop is a switch operating weight 48 for operating a switch lever 49 so that when a predetermined amount of slack has accumulated in the loop 47, the circuit to motor 45 will be opened. The switch arm 49 simultaneously with the opening of the circuit to the motor 45 closes the circuit to a motor 40 for driving take-up spool 51 so that the tape is drawn from the loop 47 onto the take-up spool under a pick-up device 52 where the recorded signal is taken off and impressed on an amplifier 53 with a translating device 54. The weight 48 carries a hook 55 similar to the hook 41 for reversing the operation of the switch arm 49 when a predetermined length of slack has been taken up in the loop 47. It is contemplated that the take-up spool 51 will drive the tape under the pick-up device 52 at a speed corresponding to the speed at which the tape 28 moves under the recording device 27 at the transmitting station.

This invention may be advantageously used in the transmission of photographs in that a sound record of the picture signal freed from static may be made at the receiving station and this sound record may be reproduced or retransmitted to a number of subscribing stations and translated into picture images at the subscribing stations. This is of advantage over the present method where the picture signals are broadcast and recorded as a picture image with the distortion caused by static and other external interference and the picture image rebroadcast to subscribers.

The particular systems described in connection with Figures 1 and 2 contemplate the interrupted transmission of signals and the interrupted reproduction of signals at the receiving station. With the systems shown in either Figure 1 or Figure 2, a definite time interval must occur between the inception of the initial signal and its translation at the receiving station. The apparatus illustrated in Figures 3 and 4 shows one form of mechanism by means of which the signals may be translated at the receiving station practically concurrently with their production at the transmitting station making possible continuous and uninterrupted transmission of sound or signal. For example, with the form of apparatus shown in Figures 3 and 4 it is contemplated that speech signals will be heard at the receiving station free of static or interference almost simultaneously with their utterance at the transmitting station without any pausing. The apparatus nevertheless enables the pitch level of the signals to be retarded or increased in the transmission over or under the pitch level at which they are produced and to be brought back to the original pitch level in the receiving station so as to cause any interfering signals to be translated in an inaudible or practically inaudible pitch range distinct from the pitch range of the transmitted signals, and which can be easily filtered out if desired.

In the apparatus illustrated in Figures 3 and 4, there is disclosed a shaft 60 about which is a sleeve shaft 61. The shaft 60 is provided with a driving pinion 60a and the shaft 61 has a driving pinion 61a. The driving pinions 60a and 61a both engage a motor driven bevel gear wheel 62, the motor being designated 63. When the motor 63 is operated, the shafts 60 and 61 are revolved at the same speed but in opposite directions. Keyed to the shaft 60 is a disc 64 having a flanged periphery 65, made up of a number of equi-distantly spaced thin steel segments 66. In the particular example illustrated, there are four of these steel segments, designated 66a, 66b, 66c and 66d. Surrounding the flanged periphery of the disc is a supporting structure 67. The supporting member 67 carries a series of equi-distantly spaced magnetic pick-up coils having pointed or wedge-shaped pole pieces at each end, the pole pieces at the inner end being very close to the circle formed by the alternate steel segments 66 and alternate non-magnetic segments on the disc 64. These pick-up devices, eight of which are illustrated in the particular modification which is shown, are designated 68a to 68h inclusive. They are all connected in a common circuit, the drawings illustrate them as being connected in series. The series of pick-up coils is connected through wires 69 with a signal transmitting station, as for example, a radio broadcasting station, the arrangement being such that signal impulses picked up in any one of the coils 68a—68h will modulate a carrier wave or other transmitting current. The transmitting station is schematically indicated as 70—71 being the radiating antenna.

Carried on the stationary support 67 adjacent each one of the pick-up coils in the series 68a—68h there are also equi-distantly spaced electro-magnets 72a to 72h; these magnets having relatively flat pole pieces projecting from each end thereof. They also may be connected either in series or in parallel. They are illustrated as being connected in series, the series being connected with the source of direct current through wires 73 to direct current source 74. These electro-magnets 72a—72h may be referred to as erasing or blotting coils, and their function will be hereinafter more fully described.

The sleeve 61 carries an arm 75 which may be counterweighted as indicated at 75'. Mounted on the arm 75 is a recording electro-magnet 76, it being generally similar to the magnets 68a—68h, but having a single pole piece which terminates in close proximity to the inner surface of the flanged periphery of which segments 66a—66d are a part. On the outer end of the arm 75 is another electro-magnet 77 which is similar to the electro-magnet 76, but which has its direction reversed with respect to the electro-magnet 76 so that its pole piece points inwardly instead of outwardly. The polarity of the two electro-magnets 76 and 77 is such that the pointed pole piece of each is of the same polarity. For illustration they are both marked N in Figure 3. The coil 77 is in vertical alignment with the coil 76 and as shown in Figure 4, the coils 76 and 77 are so positioned on the arm 75 and the magnets of the series 68a—68h and 72a—72h may be brought into axial alignment with the poles of these two electro-magnets. Also, the steel segments 66a—66d may pass between the pole piece of the electro-magnet 76 and the pole pieces of the pairs of stationary magnets.

Carried on the sleeve 61 is the secondary winding 79 of a transformer, and this secondary winding is connected through wires 81 with the two coils 76 and 77. Carried on a fixed support adjacent the secondary coil 79 is a primary coil 82 which is stationary. It is connected through wires 83 with a signal impulse generating device such as a microphone 84 and amplifier 85, the amplifier 85 being schematically illustrated.

In operation, it may be assumed that the disc 64 with the steel segments 66a—66d revolves in a clockwise direction while the arm 75 rotates in a counterclockwise direction. Since the segments 66a—66d and the recording magnet 76 are moving at the same speed in opposite directions, the relative speed is twice the relative speed of the segment 66a past the pick-up magnets 68a—68h. The recording magnet 76 on the arm 75 will move successively from segment 66a toward segment 66d. When signal impulses are impressed on the coil 76 through microphone 84, amplifier 85 and transformer 79—82, these sound impulses will be recorded electro-magnetically on that segment 66 which, at any given instant, is moving over the pole piece of the recording magnet 76. Between segments no recording takes place, but the device is preferably operated at a speed where the interruption is no more audible than it is in a commercial telephone speech where the voice-carrying current is also non-continuous, but interrupted at a frequency approaching the practical limits of audibility. The number of segments 66 may be increased beyond the four illustrated and the speeds of rotation be such that the interruptions occur with extremely high frequency.

The signal impulse which is recorded on a given segment is picked up when that segment moves under the next succeeding pick-up coil in the series 68a—68h and after being picked up it is immediately erased or blotted out by the blotting magnets in the series 72a—72h. The signals will be picked up at a pitch level which is just half the pitch level at which they were recorded, due to the fact that the arm 75 is moving in one direction while the disc 64 is moving in the opposite direction, while the pick-up magnets 68a—68h are stationary. For example, with the parts in the position shown in Figure 3, signals are being recorded on that section of segment 66a which has just moved out from under the blotting coil 72a while the pick-up magnet 68g will be picking up the last of the signals recorded on the segment 66d. There will be no signal at this time recorded by recording coil 76 on segments 66d, 66c or 66b. As soon as disc 64 has rotated a very slight distance more in a clockwise direction, segment 66d will have moved from under pick-up magnet 68g which no longer picks up the signal therefrom. However, simultaneously therewith segment 66a comes under pick-up magnet 68h which will begin to pick up the signals recorded thereon. Arm 75 will have rotated in a counterclockwise direction to a point where it will have traveled past the gap between the segment 66a and 66b and will begin to record on segment 66b just as segment 66b is moving from under the blotting coil 72b. Some segment, 66a—66d, with speech recorded on it will at all times be moving under the pole of one of the pick-up magnets 68a—68h so that the signal will be continuously broadcast from the transmitting station, but at a pitch frequency just half the pitch level of the initial signal.

It should be noted that with the mechanism of Figures 3 and 4, the pitch frequency of the signal as picked up by transmission is wholly different from the pitch frequency of recording. The speed of rotation is material only insofar as the speed of interruption affects audibility. It is contemplated that instead of extremely high speed, the unit could be operated at very low speed and each segment 66 have a more or less complete message thereon, in which case it would be a more convenient substitute for the system of Figure 1 or 2.

Figure 13 illustrates more or less crudely the operation of the mechanism shown in Figures 3 and 4 wherein the solid lines indicate a portion of the signal transmitted and the dotted lines represent intervening waves that are omitted and the bracket indicates the continuity notwithstanding the omission of parts of the signal. As previously indicated, where the device operates at high speed, the omission of part of the signal does not interfere with the continuity of reception of the signal at the receiving station.

The mode of operation of the mechanism shown in Figures 3 and 4 contemplates the recording of the signal at a given pitch frequency and its transmission at just half the pitch level of the initial signal. This apparatus may be duplicated at the receiving station, but operated in a manner to restore the speech or other transmitted signal to its normal pitch level. That is done in the manner indicated below.

The receiving mechanism is identical with that at the transmitter as illustrated in Figures 3 and 4, excepting changes in electrical connections. Referring to Figure 3, antenna 71 becomes the receiving aerial, and 70 would indicate a receiving instead of a transmitting device. The output of 70 would go through wires 69 to coils 68a—68h, which would at the receiving station be recording instead of pick-up coils.

The direction of rotation of driver 62, Figure 4, has to be reversed for receiving as otherwise the incoming signal would be erased immediately after being recorded and before being reproduced. Stationary coils 68a—68h simultaneously record the identical incoming signal on all four steel segments 66a—66d. But as the flanged periphery rotates, each of the four segments 66 passes, respectively, under one of the blotting coils 72. The record is erased and it moves under the next succeeding recording coil 68 to receive the signal then coming in. In the process of passing from under any one of recording coils 68a—68h towards one of the adjoining erasure coils 72, one of segments 66 travels over pick-up coil 76 thus inducing into it the signal impressed thereon. The signal current then flows into coil 82 where it is induced into secondary 79 from which it passes through line 83 into amplifier 85. At the receiving end of the circuit 84 would be a reproducer instead of a microphone, and the received signal would be reproduced thereby. Since the segments 66 and the pick-up coil 76 are moving at the same speed in opposite directions, the relative speed between them is twice the relative speed of segments 66 past the recording coils 68a—68h. Used as a receiver, coil 76 which becomes the pick-up coil, progressively picks up signals from the recording segments, but since it has motion in an opposite direction, the time required for it to move over the whole series will be half the time required for any given segment 66 to make a revolution, so that the sound will be produced at twice the frequency it is recorded. Since the signal from the broadcasting station is continuous, the pick-up and reproduction will be continuous. In the system time is gained to reduce pitch by imperceptibly cutting out half the vibrations at the transmitter, and the pitch level is restored by translating the transmitted signals at twice the speed to restore the original pitch of the portion that is transmitted.

When the coil 76, acting as a pick-up passes under the blanks alternating with segments 66, no signal will be recorded and these blank periods correspond to the intermittent intervals at the transmitter when no sound is being recorded. It will produce the effect of an intermittent carrier current already discussed in connection with the transmitting mechanism. The pick-up of the signal by coil 76 will be regularly intermittent because the time consumed by it in passing a segment plus the time it consumes in passing a "blank" space exactly equals the time consumed by a segment in completely passing one of the recording coils 68a—68h.

Referring to Figure 3, if the arm 75 is moved to bring the axis of coil 76 into line with the axis of one of the coils 68a—68h, then the midpoint between two segments in the series 66 will be in the line of these axes.

The receiving mechanism may be operated at any speed; preferably at a sufficiently high speed to make the interruptions inaudible.

In another method of operation, using the units of Figures 3 and 4, two transmitting mechanisms may be operated as a common unit at any speed, be it as low as desired, but out of phase to the extent that one of them always records on a segment the signal to be transmitted when the other mechanism passes a blank. The two output signals are transmitted on separate channels and reproduced by two separate receiving mechanisms, out of phase to the same extent as their transmitting counterparts, but operated in isochronism with them, respectively. The outputs of the two mechanisms are impressed on a common translating or amplifying unit. This arrangement is more complicated so far as apparatus is concerned, but does not require that any of the signal be cut out.

The apparatus just described modifies the voice frequency in the case of spoken signals so that if the transmitted or broadcast signal were picked up in an ordinary receiving apparatus, and amplified, it would be heard in a voice level very much below a natural level. Any interfering signals such as static or other station interference would, of course, be heard in such equipment at the natural pitch level. When, however, the received signal is passed through a unit which restores it to its normal pitch level, the static or other interfering signals are raised closer to the limits of audibility and are separated from the transmitted signal to such an extent as not to interfere with the reception of the transmitted signal, and where it is possible more effectively to filter them out.

The apparatus illustrated in Figures 3 and 4 transmits signal impulses at a pitch lower than the normal on a ratio of 2:1. A greater ratio of reduction may be secured by decreasing the length of the segments 66a—66d, proportionately increasing the length of the blanks, proportionately increasing the speed of arm 75 with respect to disc 65, and proportionately modifying the number of pairs of pick-up and blotting magnets. For example, for a reduction of 3:1 the blanks should be twice as long as the segments and the rotation of arm 75 and disc 65 should be of the ratio 2:1.

If the signal impulses were being impressed on the coil 76 when it was moving under one of the pick-up coils 68a—68h, there would be a direct inductive transfer of the impulse from the record coil to the pick-up coil. This would be undesirable because at that instant a signal impulse is being picked up from some other segment. The coil 77 is therefore provided to exactly neutralize the coil 76 so that no disturbing impulse is generated when the coil 76 moves past the pole piece of the one of the coils 68a—68h.

The same apparatus may be used where it is desired to transmit the signal as such at a frequency above the frequency at which the signal is generated. In such case a microphone or other signal creating device replaces antenna 71 and magnets 68a—68h are used to record, and the magnet 76 on the arm 75 is connected with the transmitter. A similar single apparatus is used at the receiving end, but it is connected in reverse. Isochronism between transmitting and receiving mechanisms is necessary, inasmuch as both transmission and reception is here intermittent.

Variation in speed between the two mechanisms is permissible when two sets of such apparatus are employed at the receiving end. In such case, they are operated from the same shaft out of phase from each other to such extent that one of them always receives and records the incoming signal when the other apparatus does not. The output of the two receiving mechanisms are impressed on a common translating or amplifying unit.

Our invention as shown in Figures 3 and 4 may be used in the process of recording sound on phonograph records or moving picture films, as well as in the reproduction of sound therefrom. In such case, the scratching and other interfering noises incident to sound reproduction are eliminated in much the same fashion as static is eliminated.

The result obtained mechanically in the apparatus illustrated in Figures 3 and 4 may also be obtained electrically without the employment of any moving parts as illustrated in Figures 5, 6 and 7. A signal generated from a microphone or any other suitable signal generating source, designated generally 99 is impressed in the customary manner upon the grid or control electrode of a conventional type cathode ray tube 100 such as is used in television reception. The tube has a pair of deflecting coils 102 by means of which the activating beam is moved up and down across a target 101. In moving up and down across the target, it produces a line of light of varying intensity, the intensity being varied according to the modulation imposed by the signals. The screen or target is of a type in which fluorescence does not desist after bombardment so that there is no persistence of the line produced on the screen. The fluorescent target 101 is of such dimension that the beam has an overtravel at the top and the bottom of the target as will be hereafter more fully explained. The cathode ray tube has its screen focused through lens system 103 onto the photo-electric mosaic 108 of iconoscope 109 so that the center of the projected vertical line of light path from the target 101 coincides with the center of the mosaic.

When the activating beam in the cathode ray tube makes one sweep upwardly across the fluorescent screen 101, it will form a nonpersisting line image. This image will be projected dot by dot through lens 103 onto the photo-electric electrode or mosaic 108. The nonpersisting line image projected onto the mosaic will record thereon a persisting electron image which will persist until neutralized or erased by the movement of the scanning beam of the iconoscope upwardly over the line image. The iconoscope 109 has a pair of deflecting coils 110 by means of which the scanning beam is caused to travel up and down in a straight line over the mosaic 108. The impulses generated by the iconoscope in accordance with the received light images are amplified in apparatus 112 and the signal impulses so generated may be transmitted from a transmitting station to a receiving station or be otherwise utilized.

Referring to Figure 6 which is a diagrammatic view illustrating the operation of the apparatus shown in Figure 5, 101 designates the target of the cathode ray tube and 108 represents the mosaic of the iconoscope. The beam generated at point $p$ moves through an arc from point D at the bottom of the target to point D' at the top of the target. However, the fluorescent screen is of such length that a line of light is produced only between the points $D^2$ and $D^3$. The nonpersisting line image produced between points $D^2$ and $D^3$ on the target 101 is transferred to the mosaic 108 of the iconoscope. The scanning beam emanating from point $p'$ moves through an arc $d$ to $d'$ corresponding to the distance between $D^2$ and $D^3$. The scanning beam of the iconoscope continuously oscillates up and down half the speed at which the activating beam of the cathode ray tube moves or oscillates. By reason of this difference in the speeds of the two beams, the scanning beam of the iconoscope travels the distance between $d$ and $d'$ in the same length of time that is required for the activating beam of the cathode ray tube to move from D to D'. The operation may be followed by tracing a single cycle of the movement of the two beams. The activating beam of the cathode ray tube starts to trace a line in moving from $D^2$ to $D^3$. At the same time the scanning beam of the iconoscope starts to move from $d$ to $d'$. By the time the activating beam of the cathode ray tube has reached $D^3$ the scanning beam of the iconoscope will have moved only half the distance from $d$ to $d'$. During the time that the activating beam is moving from point $D^3$ to D' and back again to point $D^3$, which is idle travel because no image is produced, the scanning beam of the iconoscope will have reached the point $d'$. The activating beam of the cathode ray tube then starts down from point $D^3$ to $D^2$ and the scanning beam likewise starts to move down from $d'$ to $d$, but at half the speed. Therefore, when the activating beam of the cathode ray tube reaches point $D^2$, the scanning beam of the iconoscope will be at the mid-point between $d'$ and $d$. While the scanning beam completes its movement to $d$, the activating beam will cover the additional distance from $D^2$ to $D$ and back. The scanning beam thus always lags behind the activating beam during the time that the activating beam is covering the idle or nonrecording portion of its travel. Because the scanning beam is moving at half the speed of the activating beam, the pitch of the reproduced signals will be half the pitch of the recorded signals.

Figure 7 illustrates the manner in which the equipment of Figure 5 is received at the receiving station. The incoming signal after being properly amplified, is used to modulate the activating beam of the cathode ray tube. The activating beam emanating from point $p$ moves through an arc over the target 101 from point $D^2$ to $D^3$. In so moving, it produces a nonpersisting line image on the activating fluorescent screen. This image is transferred to the mosaic 108 of the iconoscope. The scanning beam of the iconoscope, emanating from point $p$ moves through an arc from $d^3$ to $d^4$, but the mosaic of the iconoscope receives a line image only between points $d$ and $d'$. The scanning beam of the iconoscope moves twice as fast as the activating beam in the cathode ray tube so that a situation just the reverse of that described in connection with Figure 6 occurs. The operation may be followed by tracing one cycle of the record in Figure 7. The devices are so adjusted that the activating beam of the cathode ray tube starts to move from point $D^2$ to $D^3$ at the instant that the scanning beam of the iconoscope starts to travel through the idle distance from point $d$ to $d^3$ and back. By the time the activating beam of the cathode ray tube has reached the point $D^3$ the scanning beam of the iconoscope will have caught up with it and reached point $d'$. The activating beam of the cathode ray tube will then start to move from $D^3$ back to $D^2$ while the scanning beam of the iconoscope will move from $d'$ to $d^4$ and back to $d'$. The scanning beam will reach point $d$ at the same time that the activating beam reaches point $D^2$ and the cycle will then be repeated. By reason of the fact that the activating beam and cathode ray tube move at half the speed of the scanning beam of the iconoscope in Figure 7, the pitch of the signals produced by the iconoscope in Figure 7 will be raised back to the pitch of the original signals recorded on the cathode ray tube of Figure 6. The activating and scanning beams in the system shown in Figure 5 may move with such rapidity that the interruption in the signal due to only part of the signal being recorded is inconspicuous or entirely inaudible.

By using the equipment such that the transmitting station will operate as described in connection with Figure 7 and the receiving station will operate as described in connection with Figure 6, the reverse arrangement can be secured; i. e., signals can be raised from a lower pitch to a higher pitch and then brought from the higher pitch back to the normal pitch. Also, various combinations of equipment can be worked out to give over-lapping effects so as to avoid the cutting out of any of the original signal vibrations as explained in the apparatus shown in Figures 3 and 4. According to Figure 6 the pitch frequency of the signal is reduced one half, and according to Figure 7 the pitch frequency is doubled. By changing the length of the activated area of the cathode ray screen and changing the rate of movement of the electron beams of the two tubes, this ratio may be varied. For instance, a very slight increment of change in pitch could be secured by increasing the distance $D^2$ to $D^3$ in Figure 6 so that perhaps $9/10$ of the signal will be recorded instead of one half and correspondingly adjusting the operation of the inconoscope.

Figure 14 illustrates apparatus wherein the cathode ray tube and the iconoscope are combined in a single structure instead of physically separate units being employed. In this figure, 115 designates a vessel having two barrel-like extensions 116 and 117. In the extension 116 is the usual electrode arrangement and cathode ray tube, and 118 indicates the transparent target having a portion of its face covered with a fluorescent material. The light generated on the target 118 is directed toward the mosaic 119. Extension 117 of the vessel contains the customary equipment for projecting a scanning beam across the target 119 to scan the light image produced from the target 118. The general arrangement and method of operation is the same as where physically separate tubes as shown in Figure 5 are employed.

The apparatus described in connection with Figures 3, 4 and 5 not only lends itself to use in sound or other signal transmitting methods, but can be used for study and detection of various types of vibrations. For example, in the course of research in science, in medicine, in the arts, or in nature itself, vibrations of super-audible frequency may be impressed on the microphone or other pick-up device (99) in Figure 5 to produce corresponding impulses in the output of the iconoscope at half or less of the initial frequency which may be well within the audible range. Vibrations which are thus difficult or impossible to detect may be made effectively audible. Likewise, equipment of this character can be used for producing unique sound effects as for example, the overtones of certain basic sounds may be brought to a lower pitch range while the basic sound itself is reduced to a sub-audible frequency. The equipment can be used to merely shade the sound of a voice, for example, or to drop it one or two octaves as desired. A singer, for example, may be heard both in his natural voice and in a voice just slightly shaded from the natural voice or in a voice one or more octaves above or below his natural voice or in multiple voices, when more than one apparatus is employed. Various other uses suggest themselves for application where it is desirable or necessary to change the pitch level of a sound type or vibration to a different pitch level.

With the apparatus described in Figures 3 and 4, where it is operating at high speed, the record persists on the magnetic segments only a very slight fraction of a second before being erased. Likewise, where a system such as illustrated in Figure 5 is employed, the record is in the form of a so-called "electron image," which persists only until it is wiped off by the scanning beam. The term "record" as used in the present application and in the accompanying claims is intended, in its broadest aspect, to include records of this character whose persistence in point of time is very short, as well as permanent records such as photographic or phonographic recordings. While one phase of the invention pertains primarily to the transmission of signals between a transmitting and a receiving station, certain phases of the method and apparatus are useful for applications above mentioned and for other uses where signals of some kind are turned into electrical impulses and then reconverted into other impulses at a different pitch level. It will be noted that in all of the embodiments of the invention illustrated, all of that portion of the signal which is originally put on the record is subsequently reproduced. With both the apparatus illustrated in Figures 3 and 4 and with the apparatus illustrated in Figure 5, certain portions of the original signal are not recorded, but all portions which are recorded are subsequently reproduced.

While I have illustrated and described certain specific embodiments of my invention, it will be understood that this is by way of illustration and that various changes and modifications may be made within the contemplation of my invention and under the scope of the following claims.

We claim:

1. A signalling method which comprises recording signal impulses and converting them through periodic omissions of some recorded impulses into other signal impulses, one of the steps being continuous and one being intermittent, the periodic omissions being of such high frequency that the converted signal retains an approximate resemblance to the recorded impulses.

2. The method of recording sound or like vibrations which comprises the intermittent cutting out of portions of the vibrations to make the recording of the sound intermittent, followed by its reproduction in a continuous and uninterrupted sequence.

3. The method of recording and reproducing sound or like vibrations which comprises continuously recording the same and reproducing it from a record in such manner as to record all the impulses and reproduce them intermittently with alternating predetermined silent periods, the alternations between reproducing and silent periods being at a frequency so high that the reproduction is audibly continuous.

4. Apparatus of the class described comprising means for recording portions of a succession of signal impulses and for cutting out other portions in rapid sequence, and means for reproducing the signal impulses from the record so made in approximately the same period of time as that required for the recording, whereby the reproduction will be at a lower pitch than the original signal by reason of the said cutting out of some portions.

5. A signalling apparatus comprising a transmitting station and a signal receiving station, means at the transmitting station for producing a record of the signals to be transmitted, means for generating signal impulses from such record with the record moving at a speed widely different from the speed of the record during the original recording, means at the receiving station for recording the transmitted signals, and means for translating the record made at the receiving station at a speed corresponding to the speed of the initial record at the transmitting station, and other means for simultaneously transmitting signals between the two stations from signal impulses generated in a pitch range widely different from the pitch range of the initial signals during transmission.

6. The method of changing the pitch frequency of primary signal impulses having an initial frequency in the range of audibility or higher which comprises utilizing such primary signal impulses to modulate a cathode ray projector in which the beam of said projector traverses a path of fixed amplitude to transform said primary signal impulses into an electronic image, and scanning said image with an electron image scanning beam which also swings through a path of fixed amplitude which is different from the amplitude of the cathode ray but which is traversed in the same period of time to thereby produce signal impulses from the electron image of a different frequency from the primary impulses.

ROBERT LLOYD BARRISH.
GEORGE BARRISH.